US011585454B2

(12) United States Patent
Robinson et al.

(10) Patent No.: US 11,585,454 B2
(45) Date of Patent: Feb. 21, 2023

(54) VALVE PLUG

(71) Applicant: Dyna-Flo Control Valve Services Ltd., Edmonton (CA)

(72) Inventors: Cameron B. Robinson, Sherwood Park (CA); Curtis G. Dale, Beaumont (CA)

(73) Assignee: Dyna-Flo Control Valve Services Ltd., Edmonton (CA)

( * ) Notice: Subject to any disclaimer, the term of this patent is extended or adjusted under 35 U.S.C. 154(b) by 0 days.

(21) Appl. No.: 17/347,454

(22) Filed: Jun. 14, 2021

(65) Prior Publication Data

US 2021/0388913 A1    Dec. 16, 2021

(30) Foreign Application Priority Data

Jun. 14, 2020 (CA) ................. CA 3083510

(51) Int. Cl.

| F16K 17/24 | (2006.01) |
| F16K 1/12 | (2006.01) |
| F16K 1/46 | (2006.01) |
| F16K 1/38 | (2006.01) |
| F16K 1/42 | (2006.01) |
| F16K 15/06 | (2006.01) |
| F16K 25/00 | (2006.01) |

(52) U.S. Cl.
CPC ........... *F16K 17/24* (2013.01); *F16K 1/12* (2013.01); *F16K 1/385* (2013.01); *F16K 1/42* (2013.01); *F16K 1/465* (2013.01); *F16K 15/06* (2013.01); *F16K 25/005* (2013.01)

(58) Field of Classification Search
CPC . F16K 17/24; F16K 1/12; F16K 1/385; F16K 1/42; F16K 1/38; F16K 15/06; F16K 25/005; F16K 3/246
See application file for complete search history.

(56) References Cited

U.S. PATENT DOCUMENTS

| 2,886,283 | A | * | 5/1959 | Natho ................. F16K 1/46 251/363 |
| 3,009,678 | A | | 11/1961 | Soderberg et al. |
| 3,601,147 | A | | 8/1971 | Myers |
| 3,892,384 | A | | 7/1975 | Myers |
| 4,026,515 | A | * | 5/1977 | Grove ................ F16K 3/243 277/436 |
| 7,721,753 | B2 | | 5/2010 | Wears |
| 8,505,578 | B2 | | 8/2013 | Nebel |
| 9,022,070 | B2 | | 5/2015 | Anderson |

(Continued)

FOREIGN PATENT DOCUMENTS

| EP | 3376084 A1 | 9/2018 |
| GB | 521103 | 5/1940 |

*Primary Examiner* — Patrick C Williams
(74) *Attorney, Agent, or Firm* — Christensen O'Connor Johnson Kindness PLLC

(57) ABSTRACT

A plug for a fluid valve has a stem extending along an axis between a first end and a second end, a tip secured to the first end of the stem, a plug body mounted to the stem toward the second end relative to the tip, and a valve seat between the tip and the plug body. The valve seat has a sealing surface that extends past an outer perimeter of the tip and is sized to engage a valve ring of the fluid valve, the valve seat defining an annular space that permits radial movement of the valve ring relative to the axis of the stem to align with the valve ring as pressure is applied to the valve seat.

18 Claims, 4 Drawing Sheets

(56) References Cited

U.S. PATENT DOCUMENTS

| | | |
|---|---|---|
| 9,267,604 B2 | 2/2016 | Bell |
| 9,395,019 B2 | 7/2016 | Cunningham |
| 10,208,863 B2 | 2/2019 | Robinson et al. |
| 10,352,459 B2 | 7/2019 | Jackson |
| 10,400,899 B2 | 9/2019 | Jackson |
| 10,870,320 B2 * | 12/2020 | Qi ................... B60C 23/00372 |
| 2012/0037832 A1 * | 2/2012 | Sauer .................... F16J 15/061 |
| | | 251/359 |
| 2014/0124692 A1 * | 5/2014 | Baumann ................. F16K 1/38 |
| | | 251/332 |
| 2016/0215891 A1 * | 7/2016 | Thomson ................. F16K 1/34 |
| 2018/0112780 A1 * | 4/2018 | Rain ..................... F16K 25/005 |

* cited by examiner

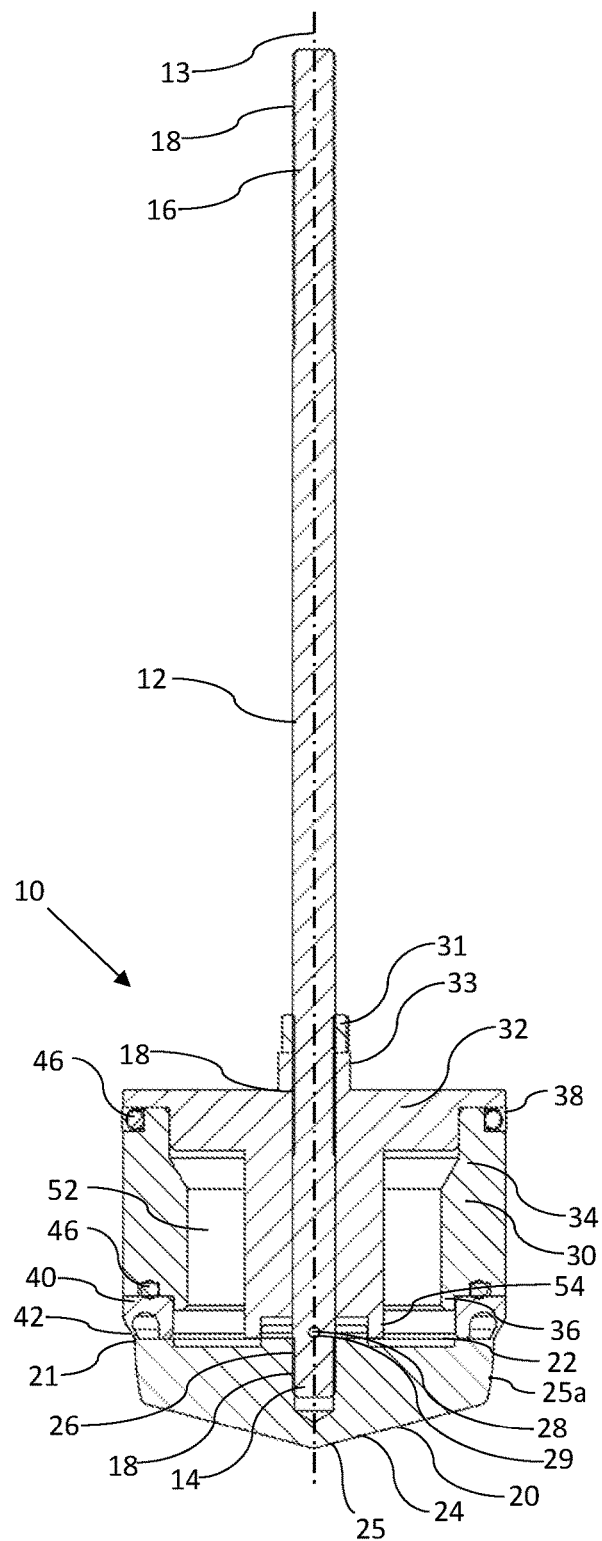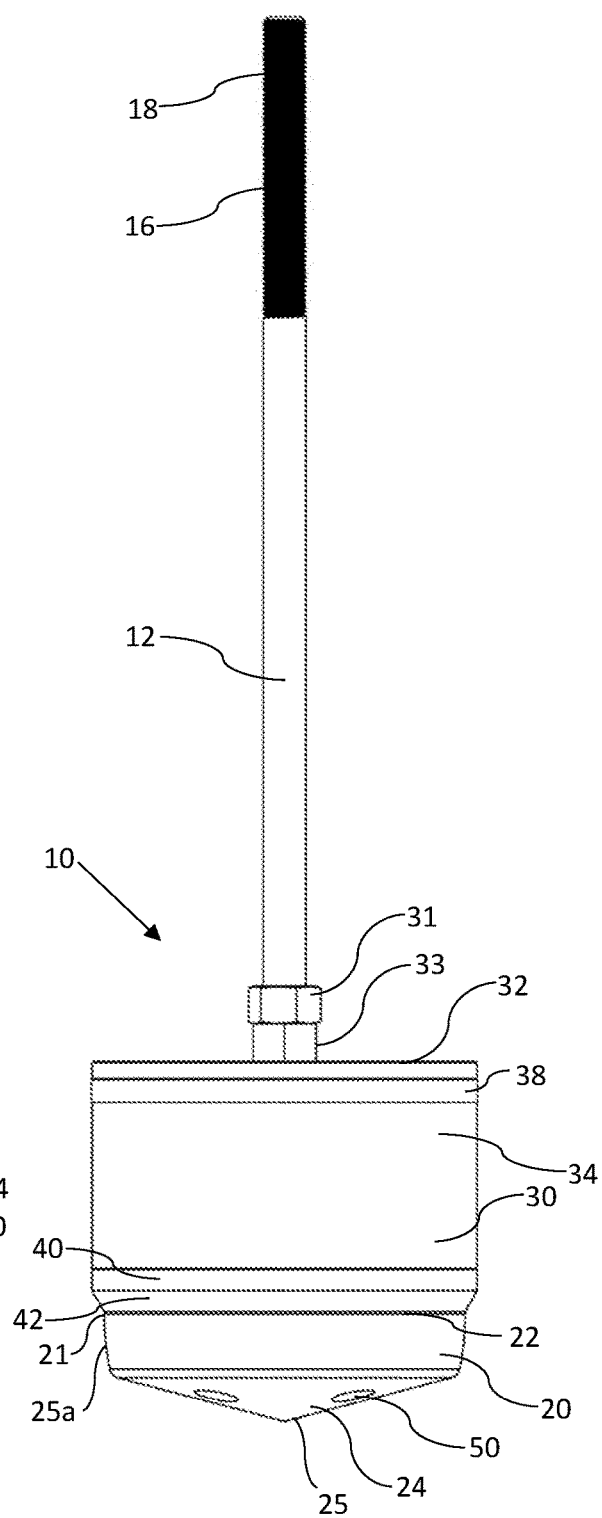
FIG. 1
FIG. 2

VALVE PLUG

TECHNICAL FIELD

This is related to a valve plug for a pressure-balanced fluid valve, and in particular, a valve plug with a floating valve seat.

BACKGROUND

Pressure balancing valve plugs are commonly used in the control valve industry due to the smaller size and lower cost actuation. When made from hard materials, care must be taken to ensure the valve plug is properly aligned with the valve housing. An example of a pressure-balanced fluid valve is described in U.S. Pat. No. 3,892,384 (Myers), entitled "Double Seated Cage Valve with Flexible Plug Seat".

SUMMARY

According to an aspect, there is provided a plug for a fluid valve, such as a pressure-balanced fluid valve. The plug comprises a stem extending along an axis between a first end and a second end, a tip secured to the first end of the stem, a plug body mounted to the stem toward the second end relative to the tip, and a valve seat between the tip and the plug body. The valve seat having a sealing surface that extends past an outer perimeter of the tip that is sized to engage a valve ring of the fluid valve. The valve seat defines an annular space that permits radial movement of the valve seat relative to the axis of the stem to align with the valve ring as pressure is applied to the valve seat. According to other aspects, the plug may comprise one or more of the following features, alone or in combination: there may be a seal that seals between the valve seat and the plug body that permits limited axial movement of the valve seat relative to the axis of the stem; the valve seat may be restrained from moving axially relative to the stem; there may be fluid passages between the tip and the plug body such that the plug is a pressure-balanced plug; the plug body may comprise a central shaft threaded onto the stem and an outer sleeve, the outer sleeve engaging the valve seat; the plug body may be threaded onto the stem and secured by a lock nut; the tip may be threaded onto the stem and secured with a pin that locks the rotational position of the tip on the stem; the stem may engage a rear side of the tip that is opposite a fluid-facing side of the tip, and the fluid facing side of the tip may be cone shaped; and the valve seat may be metal and the sealing surface of the valve seat may be sufficiently resilient to sealingly conform to an out-of-round valve ring.

According to another aspect, there is provided a pressure-balanced fluid valve comprising a valve housing comprising an inlet, an outlet, and a flow passage between the inlet and the outlet; a valve ring in the flow path between the inlet and the outlet, the valve ring having a central axis that extends perpendicular to the valve ring; and a plug within the valve housing that is movable along the central axis between a sealing position in which the flow path is blocked and an open position in which the flow path is open. The plug comprises a plug as described above. The valve may have a fluid flow profile that is defined by the movement of the valve seat relative to the valve ring.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is a side elevation view in section of a plug;

FIG. 2 is a side elevation view of the plug shown in FIG. 1;

DETAILED DESCRIPTION OF PREFERRED EMBODIMENTS

Figure 3:
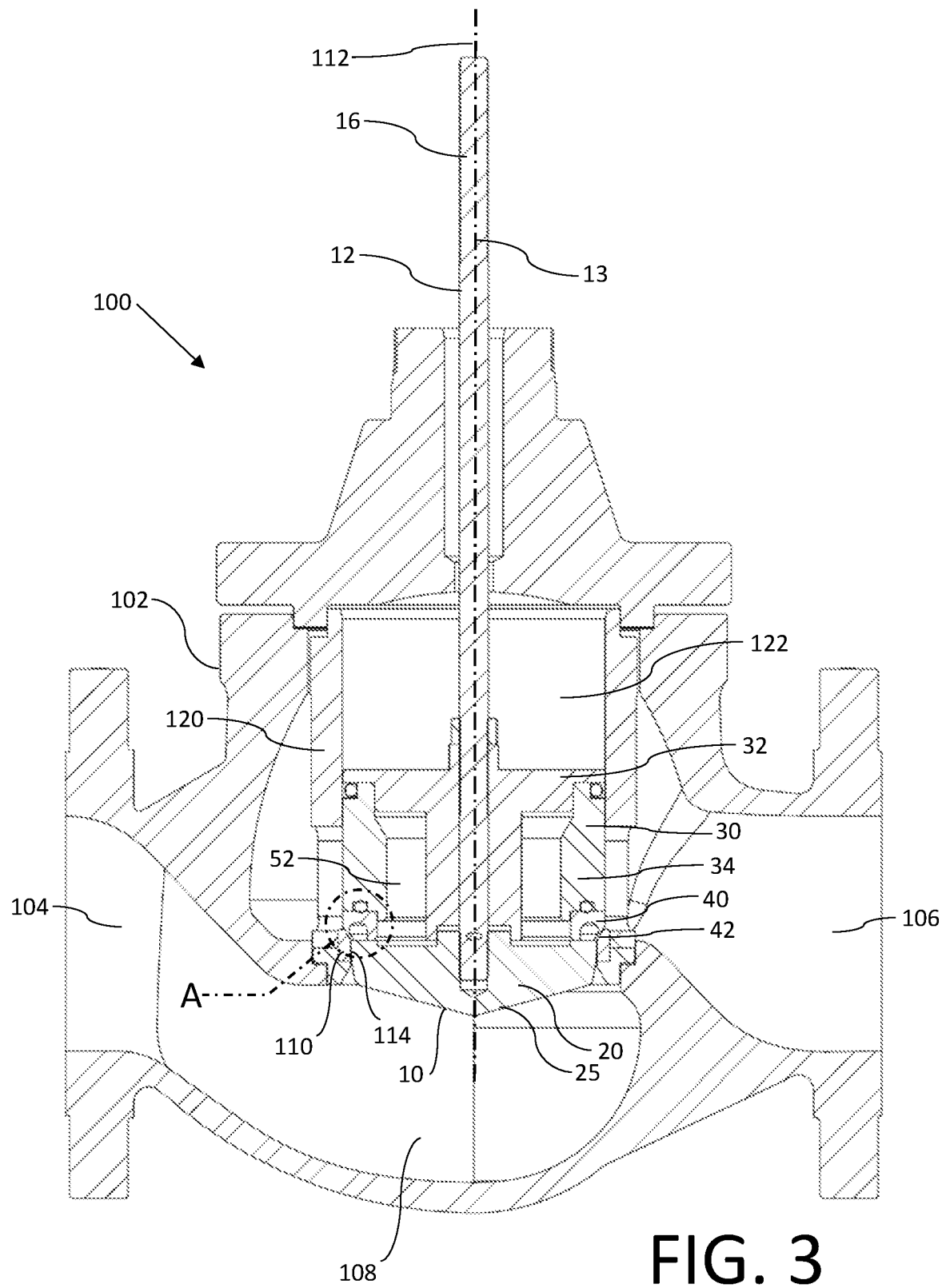
FIG. 3 is a side elevation view in section of a pressure balanced valve including the plug shown in FIG. 1.

A plug, generally identified by reference numeral 10, will now be described with reference to FIG. 1 through 5. Plug 10 is designed for use in a fluid valve 100, typically a pressure balanced fluid valve such as may be used in a high pressure fluid line. Referring to FIG. 3, fluid valve 100 has a valve housing 102 with an inlet 104, an outlet 106, and a flow passage 108 between inlet 104 and outlet 106. A valve ring 110 is disposed in flow path 108 between inlet 104 and outlet 106 and has a central axis 112 that extends perpendicularly through valve ring 110. Plug 10 resides within valve housing 102 and is movable along central axis 112 between a sealing position in which flow passage 108 is blocked and an open position in which flow path 108 is open. As shown, fluid valve 100 is in a flow-up configuration, where fluid flows from left to right in the depicted view. Fluid valve 100 may also be used in a flow-down configuration, where the fluid flows right to left in the depicted view. The configuration depends primarily on the way it is connected to the flow line (not shown). A flow up configuration may be preferred as it results in a more distributed, even flow around plug 10 in the open position.

Referring to FIG. 1, plug 10 has a stem 12 that extends along an axis 13 between a first end 14 and a second end 16. Plug 10 is installed such that axis 13 is aligned with axis 112 of valve ring 110, as shown in FIG. 3. Referring again to FIG. 1, plug 10 has a tip 20 secured to first end 14 of stem 12 and has a rear side 22 opposite a fluid-facing side 24. Fluid-facing side 24 is oriented toward inlet 104 in the flow-up configuration but would be oriented toward outlet 106 in the flow-down configuration. Stem 12 is fixedly secured to rear side 22 of tip 20 opposite fluid-facing side 24. If stem 12 is threaded, tip 20 must also be rotationally fixed to prevent tip 20 from moving. As shown, this is accomplished by threading stem 12 into a threaded socket 26 carried by tip 20 onto threads 18 of stem 12 and a pin 28 is used to secure tip 20 to stem 12 and lock the rotational position of tip 20 relative to stem 12. As can be seen, pin 28 is inserted through a groove formed in threaded socket 26 and a hole 29 that extends through stem 12. Other designs may be used to lock tip 20 onto stem 12, such as by using a locking ring or other design. As will be understood from the discussion below, it is required that tip 20 be fixed along the length of stem 12, however the rotational orientation of tip 20 may vary unless required by a specific design. However, as threads are commonly used, this will typically require that tip 20 is locked onto stem 12 rotationally as well. Referring to FIG. 2, fluid-facing side 24 of tip 20 may be designed with a profile to achieve a desired flow characteristic through valve ring 110 (shown in FIG. 3). Referring to FIG. 2, tip 20 has a cone-shaped profile 25 with a tapered sidewall 25*a*. Profile 25 and 25*a* are designed such that, as plug 10 moves between the open and sealing positions, a predictable flow and change in flow is achieved. Tip 20 has an outer perimeter 21, shown at the top edge of tip 20, that has a radius that is smaller than an inner radius 114 of valve ring 110 such that tip 20 passes in or out of valve ring as plug 10 is moved between an open position and a sealing position.

Referring to FIG. 1, plug 10 includes a plug body 30 that is mounted to stem 12 above tip 20, i.e. toward second end 16 of stem 12 in a fixed position relative to tip 20. As shown, this is accomplished by threading plug body 30 onto stem 12 to a desired tightness against valve seat 40, and securing plug body 30 in place using a locknut 31 that tightens against a top profile 33 of plug body 32. In this manner, plug body 30 may be fixed in place with an adequate amount of force as applied by locknut 31 while still permitting plug body 30 to be tightened to a lesser degree against valve seat 40 as will be discussed below. allowing a reduced amount of force. Plug body 30 may take different forms, however the depicted example includes a central, threaded shaft 32 that receives stem 12 and an outer sleeve 34 that defines a hollow, annular chamber 52 between sleeve 34 and central shaft 32 that is part of the pressure-balancing fluid channel that includes apertures 50 in tip 20 and plug body 30 that is required in order to allow plug 10 to be a pressure-balancing plug. Sleeve 34 may be integrally formed with central shaft 32, or as a separate component, as shown.

Figure 4:
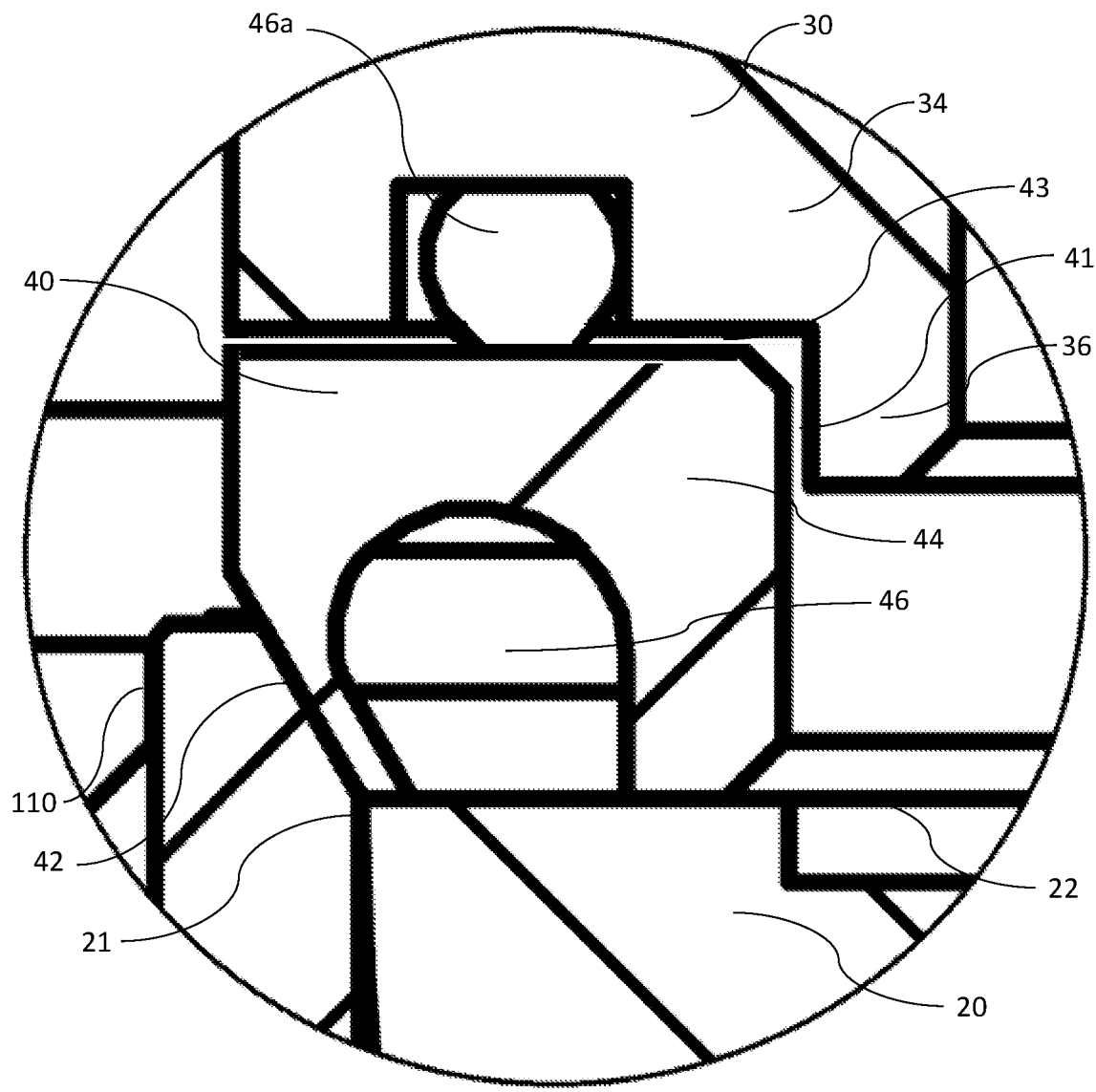
FIG. 4 is a detail view of detail A indicated in FIG. 3, showing the valve seat of the plug.

Plug 10 has a valve seat 40 carried between tip 20 and plug body 30. Valve seat 40 is held in place between the plug body 30, or the outer sleeve 34 of plug body 30 as shown, and the rear side 22 of tip 20. Tip 20 and plug body 30 secure valve seat 40 against movement in an axial direction relative to axis 13, while also permitting movement in a radial direction relative to axis 13. As shown, this is accomplished by locking tip 20 in place on stem 12, and tightening plug body 30 against valve seat 40 to a sufficient degree that valve seat 40 is held in place while still allowing valve seat 40 to move to a limited degree. Referring to FIG. 4, a seal 46*a* is positioned between valve seat 40 and plug body 30. Seal 46*a* is made from a resilient material and is used to create a seal adjacent to valve seat 40. Valve seat 40 may have upper and lower seals such that a seal is created between both plug body 30 and tip 20. While the discussion below is in terms of seal 46*a* above valve seat 40, the discussion may also apply to other designs with similar types of seals above, below, or both above and below valve seat 40. As valve seat 40 is installed between plug body 30 and tip 20, seal 46*a* will engage plug body 30 sufficiently to hold and seal around valve seat 40. However, as can be seen, a limited amount of radial and axial movement is permitted. In particular, axial movement of valve seat 40 is limited to a degree that maintains a seal around valve seat 40, while maintaining the friction against valve seat 40 by tip 20 and plug body 30 at a relatively low level so that radial movement is permitted to a certain degree. Referring to FIG. 3, this limited radial movement allows valve seat 40 to align with valve ring 110 as plug 10 moves to a closed position. As such, the friction applied to valve seat 40 by seal 46*a* should be sufficiently low that the force applied to stem 12 by a valve actuator (not shown) when moving plug 10 to the closed position is sufficient to cause valve seat 40 to align with valve ring 110. In some examples, seal 46*a* maintains a seal while preventing a metal-to-metal contact that may otherwise clamp valve seat 40 sufficiently to prevent radial movement of valve seat 40 to align with valve ring 110. Other designs may be used to reduce the friction while sealing against valve seat 40. In this matter, the components of plug 10 and fluid valve 100 may be assembled more easily, such as with fewer adjustments required when tightening components, particularly when valve 100 and plug 10 are made from hard materials. Referring to FIG. 4, plug body 30 may have a shoulder 36 that engages the inner surface of valve seat 40 to hold valve seat 40 in place and defines the amount of radial movement of valve seat 40 that is permitted. As can be seen, there is a small gap 41 between shoulder 36 and valve seat 40 that permits valve seat 40 to move from side to side in order to adjust and align with valve ring 110. In addition, seal 46*a* may maintain a small gap 43 along the top of valve seat 40 that permits a small amount of vertical movement and that is maintained by o-ring 46*a*. This may be used to facilitate movement of valve seat 40 in a radial direction, as required to properly adjust to valve ring 110, which may otherwise be difficult if a metal-to-metal connection were made against valve seat 40. As stem 12 is actuated toward the closed position, valve seat 40 will engage valve ring 110 and may shift radially, where required, to align with valve ring 110. Further movement may close gap 43 by compressing o-ring 46*a* and may result in metal-to-metal contact between valve seat 40 and plug body 30. The actual size of gaps 41 and 43 may vary but will typically be quite small as it is anticipated that, in most cases, only a small amount of adjustment will be required. In some embodiments, valve seat 40 may be sufficiently restrained to prevent axial movement. It will also be understood that other designs to hold valve seat 40 in place while permitting some movement are also possible. For example, shoulder 36 may be carried by tip 20 rather than plug body 30.

Referring to FIG. 4, sealing surface 42 of valve seat 40 may be made of a resilient material and in a manner that allows sealing surface 42 to flex to a limited degree. As valve seat 40 engages valve ring 110, this allows sealing surface 42 to conform to valve ring 110 such as by moving in a direction that is substantially normal to the surface of sealing surface 42. This permits a better seal to be formed by valve seat 40 if valve ring 110 is out-of-round, which may occur, for example, when installing valve ring 110 in valve 100.

Valve 100 and plug 10 may be manufactured using known materials that are commonly used in manufacturing such components. By manufacturing plug 10 as described herein, plug 10 may be disassembled and reassembled for servicing relatively easily with replaceable components, and with the connection points protected against abrasive fluid flow. Valve seat 40 has a sealing surface 42 that extends past outer perimeter 21 of tip 20 and is sized to engage valve ring 108 of fluid valve 100 when plug 10 is moved to a closed position. Referring to FIG. 3, plug 10 may have one or more sealing elements 46 that seal between the components of plug 10, or between plug 10 and valve housing 102. Plug 10 may be disposed in and move within a cage 120 in valve housing 102. Plug body 30 may have a cage seal 38 that seals between pressure balance chamber 122 and outlet 106. As will be understood, pressure-balanced valves have similar features and, while custom designs may be possible, plug 10 is intended to be used in the most common style of valve 100 such that it may be retrofitted into existing valves.

Figure 5:
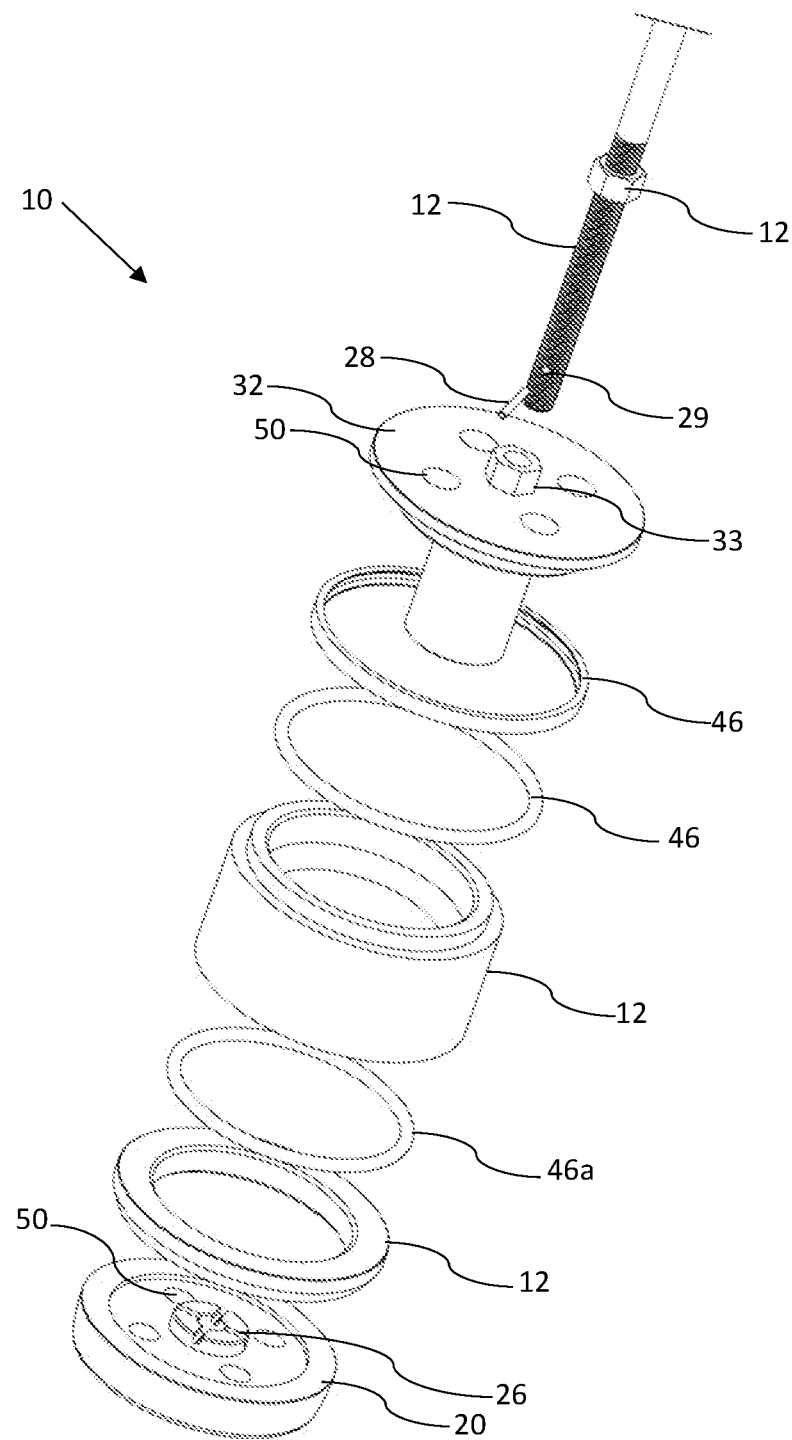
FIG. 5 is an exploded perspective view of the valve plug shown in FIG. 1.

Referring to FIG. 5, the depicted example of plug 10 is assembled by first threading central shaft 32 of plug body 30 onto stem 12, and positioning outer sleeve 34 with seals 46 and 38 into place as shown. Valve seat 40 is placed adjacent to outer sleeve 34 then tip 20 is threaded on stem 12 and locked in place by inserting pin 28 through hole 29 such that pin 28 engages the grooves in socket 26. The depicted grooves permit tip 20 to be adjusted in quarter-turn increments relative to stem 12. Plug body 30 is threaded onto stem 12 until it engages valve seat 40. Typically, plug body 30 will be about hand tight, for example by threading plug body 30 onto stem 12 until contact is made, and then applying an additional quarter- or half-turn. Other means of applying an appropriate amount of torque may also be used. Once installed, plug body 30, tip 20, and valve seat 40 are assembled sufficiently to permit valve seat 40 to move radially, which may require or involve some axial movement, such as, Referring to FIG. 1, as central shaft 32 is threaded onto stem 12, central shaft 32 may also engage with tip 12, such as by causing a collar 54 carried at the bottom end of shaft 32 to overlie pin 28 and therefore hold pin 28 in place until plug body 30 is removed. As can be seen, preferably plug body 30 does not have a surface that clamps against tip 20, but is instead spaced a small amount to ensure any clamping force is applied to valve seat 40, with collar 50 acting to help align tip 20 and plug body 30, if necessary. Once plug body 30 is properly positioned, a locknut 31 may be installed above plug body 30 to secure plug body 30 in place. Preferably, plug body 30 will have a non-circular profile that allows a tool, such as a wrench, to hold it in place while locknut 31 is tightened. As plug body 30 is installed, the appropriate seals and o-rings 46 are also installed. Plug 10 may then be disassembled by reversing the steps described above.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A plug for a fluid valve, the plug comprising:
   a stem extending along an axis between a first end and a second end;
   a tip secured to the first end of the stem;
   a plug body mounted to the stem toward the second end relative to the tip; and
   a valve seat between the tip and the plug body, the valve seat having an inner surface and a sealing surface, wherein the sealing surface extends past an outer perimeter of the tip and is sized to engage a valve ring of the fluid valve, the inner surface defining an annular space that permits radial movement of the valve seat such that the inner surface moves radially relative to the axis of the stem to align the valve seat with the valve ring as pressure is applied to the valve seat, the inner surface maintaining a fixed inner radius as the valve seat moves radially.

2. The plug of claim 1, further comprising a seal that seals between the valve seat and the plug body that permits limited axial movement of the valve seat relative to the axis of the stem.

3. The plug of claim 1, comprising fluid passages between the tip and the plug body such that the plug is a pressure-balanced plug.

4. The plug of claim 1, wherein the plug body comprises a central shaft threaded onto the stem and an outer sleeve, the outer sleeve engaging the valve seat.

5. The plug of claim 1, wherein the plug body is threaded onto the stem and secured by a lock nut.

6. The plug of claim 1, wherein the tip is threaded onto the stem and secured with a pin that directly engages the tip and the stem to lock a rotational position of the tip on the stem.

7. The plug of claim 1, wherein the stem engages a rear side of the tip that is opposite a fluid-facing side of the tip.

8. The plug of claim 7, wherein the fluid facing side of the tip is cone shaped.

9. The plug of claim 1, wherein the valve seat is metal and the sealing surface of the valve seat is sufficiently resilient to sealingly conform to an out-of-round valve ring.

10. A pressure-balanced fluid valve comprising:
    a valve housing comprising an inlet, an outlet, and a flow passage between the inlet and the outlet;
    a valve ring in the flow passage between the inlet and the outlet, the valve ring having a central axis that extends perpendicular to the valve ring; and
    a plug within the valve housing that is movable along the central axis between a sealing position in which the flow passage is blocked and an open position in which the flow passage is open, the plug comprising:
    a stem extending along the central axis and having a first end and a second end;
    a tip secured to the first end of the stem;
    a plug body mounted to the stem toward the second end relative to the tip;
    a valve seat between the tip and the plug body, the valve seat having an inner surface and a sealing surface, wherein the sealing surface extends past an outer perimeter of the tip that sealingly engages the valve ring, the inner surface defining an annular space that permits radial movement of the valve seat such that the inner surface moves radially relative to the axis of the stem to align the valve seat with the valve ring as pressure is applied to the valve seat, the inner surface maintaining a fixed inner radius as the valve seat moves radially; and
    fluid passages between the tip and the plug body to balance pressure between the first end and the second end of the stem.

11. The pressure balanced valve of claim 10, further comprising a seal that seals between the valve seat and the plug body that permits limited axial movement of the valve seat relative to the axis of the stem.

12. The pressure balanced valve of claim 10, wherein the valve has a fluid flow profile that is defined by the movement of the valve seat relative to the valve ring.

13. The pressure balanced valve of claim 10, wherein the plug body comprises a central shaft threaded onto the stem and an outer sleeve, the outer sleeve engaging the valve seat, the central shaft and outer sleeve defining an annular cavity.

14. The pressure balanced valve of claim 10, wherein the plug body is threaded onto the stem and secured by a lock nut.

15. The pressure balanced valve of claim 10, wherein the tip is threaded onto the stem and secured with a pin that directly engages the tip and stem to lock a rotational position of the tip on the stem.

16. He pressure balanced valve of claim 10, wherein the stem engages a rear side of the tip that is opposite a fluid-facing side of the tip.

17. The pressure balanced valve of claim 16, wherein the fluid-facing side of the tip is cone shaped.

18. The pressure balanced valve of claim 10, wherein the valve seat is metal and the sealing surface of the valve seat is sufficiently resilient to sealingly conform to an out-of-round valve ring.

* * * * *

UNITED STATES PATENT AND TRADEMARK OFFICE
CERTIFICATE OF CORRECTION

PATENT NO. : 11,585,454 B2  
APPLICATION NO. : 17/347454  
DATED : February 21, 2023  
INVENTOR(S) : C. Robinson et al.

Page 1 of 1

It is certified that error appears in the above-identified patent and that said Letters Patent is hereby corrected as shown below:

In the Claims

| Column | Line | |
|--------|------|---|
| 6 | 63 | change "he pressure" to -- The pressure -- |

Signed and Sealed this
Fifteenth Day of April, 2025

Coke Morgan Stewart
*Acting Director of the United States Patent and Trademark Office*